(12) United States Patent
Burle et al.

(10) Patent No.: US 10,397,747 B2
(45) Date of Patent: Aug. 27, 2019

(54) ENTITY TRACKING

(71) Applicant: Celect, Inc., Boston, MA (US)

(72) Inventors: Sai Kiran Burle, Boston, MA (US);
Joshua Lee, Cambridge, MA (US);
Devavrat Shah, Waban, MA (US);
Vishal Doshi, Somerville, MA (US);
Ying-zong Huang, Seattle, WA (US);
Quan Li, Chicago, IL (US)

(73) Assignee: Celect, Inc., Boston, MA (US)

(*) Notice: Subject to any disclaimer, the term of this patent is extended or adjusted under 35 U.S.C. 154(b) by 0 days.

(21) Appl. No.: 16/190,034

(22) Filed: Nov. 13, 2018

(65) Prior Publication Data

US 2019/0200167 A1 Jun. 27, 2019

Related U.S. Application Data

(60) Provisional application No. 62/610,230, filed on Dec. 24, 2017.

(51) Int. Cl.
| H04W 24/00 | (2009.01) |
| H04W 4/02  | (2018.01) |
| G01C 21/34 | (2006.01) |
| G01C 21/36 | (2006.01) |

(52) U.S. Cl.
CPC ........ *H04W 4/027* (2013.01); *G01C 21/3484* (2013.01); *G01C 21/3617* (2013.01)

(58) Field of Classification Search
None
See application file for complete search history.

(56) References Cited

U.S. PATENT DOCUMENTS

| 2012/0010996 A1* | 1/2012 | Horvitz ................. G06Q 30/02 |
| | | 705/14.53 |
| 2015/0073702 A1* | 3/2015 | Jouaux ................. G06Q 10/047 |
| | | 701/465 |

* cited by examiner

*Primary Examiner* — Erika A Washington
(74) *Attorney, Agent, or Firm* — Danielson Legal LLC

(57) ABSTRACT

Systems and methods for tracking at least one entity. Systems according to various embodiments may include an interface for at least receiving training data representing movements of a plurality of training entities and a query regarding a test entity's movement, a memory, and at least one processor executing instructions stored on the memory to create a plurality of tracks, generate an index of the plurality of tracks, execute the received query, and output a feature value with respect to the test entity.

14 Claims, 7 Drawing Sheets

ENTITY TRACKING

CROSS-REFERENCE TO RELATED APPLICATIONS

The present application claims the benefit of U.S. provisional application No. 62/610,230, filed on Dec. 24, 2017, the entire disclosure of which is incorporated by reference as if set forth in its entirety herein.

TECHNICAL FIELD

Embodiments described herein generally relate to systems and methods for tracking an entity and, more particularly but not exclusively, to systems and methods for tracking an entity's movement.

BACKGROUND

Prior art methods for tracking the movement of an object or an entity involve equipping the target with sensors that report the target's location. Geospatial and temporal data may be derived from these location-based sensors. This data may include a set of coordinates representing the physical location of the sensor, the time of the sensor reading, and other information associated with the sensor (i.e., identifying information for the sensor and properties specific for the domain of interest).

However, this data may be intermittent or inaccurate and may not provide meaningful information about the target associated with the data. This data is also retrospective, in that it only provides information about the past location of a target, and not its future location.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a system for tracking at least one entity. The system includes an interface for at least receiving training data representing movements of a plurality of training entities and a query regarding a test entity's movement; a memory; and at least one processor executing instructions stored on the memory to create a plurality of tracks based on the received training data, wherein each track represents the movement of a training entity and is associated with at least one attribute, generate an index of the plurality of tracks, execute the received query regarding the test entity's movement on the generated index, and output a feature value with respect to the test entity based on the generated index.

In some embodiments, the test entity is selected from the group consisting of a person, a ship, an aircraft, and a vehicle.

In some embodiments, the feature value is an anomaly score representing whether the test entity's movement is anomalous with respect to the at least one attribute.

In some embodiments, the feature value is a prediction of the test entity's movement.

In some embodiments, the at least one processor is further configured to generate the index by defining at least one of the tracks using a plurality of points from the received training data, wherein each point of the plurality represents a location of a training entity at a point in time. In some embodiments, the at least one processor is further configured to execute a function to develop a trend line associated with the plurality of points and represent the track by the developed trend line. In some embodiments, the at least one processor is further configured to add a buffer to the developed trend line.

In some embodiments, the at least one attribute includes one or more of a city associated with the entity, a country associated with the entity, and an entity type.

According to another aspect, embodiments relate to a method for tracking at least one entity. The method includes receiving training data representing movements of a plurality of training entities using an interface; creating, using at least one processor executing instructions stored on a memory, a plurality of tracks based on the received training data, wherein each track represents the movement of a training entity and is associated with at least one attribute; generating, using the at least one processor, an index of the plurality of tracks; receiving a query regarding a test entity's movement using the interface; executing, using the at least one processor, the received query regarding the test entity's movement on the generated index; and outputting, using the at least one processor, a feature value with respect to the test entity based on the generated index.

In some embodiments, the test entity is selected from the group consisting of a person, a ship, an aircraft, and a vehicle.

In some embodiments, the feature value is an anomaly score representing whether the test entity's movement is anomalous with respect to the at least one attribute.

In some embodiments, the feature value is a prediction of the test entity's movement.

In some embodiments, generating the index includes defining at least one of the tracks using a plurality of points from the received training data, wherein each point of the plurality represents a location of a training entity at a point in time. In some embodiments, generating the index further includes executing a function to develop a trend line associated with the plurality of points and representing the track by the developed trend line. In some embodiments, the method further includes adding a buffer to the developed trend line.

In some embodiments, the at least one attribute includes one or more of a city associated with the entity, a country associated with the entity, and an entity type.

According to yet another aspect, embodiments relate to a system for tracking at least one entity. The system includes an interface for at least receiving training data representing movements of a plurality of training entities and a query regarding a test entity's movement; a memory; and at least one processor executing instructions stored on the memory to create a plurality of tracks based on the received training data, wherein each track represents the movement of a training entity and is associated with at least one attribute, generate an index of the plurality of tracks, execute the received query regarding the test entity's movement on the generated index, and output at least one of an anomaly score representing whether the test entity's movement is anomalous with respect to the at least one attribute, and a prediction of the test entity's movement.

In some embodiments, the test entity is selected from the group consisting of a person, a ship, an aircraft, and a vehicle.

In some embodiments, the at least one attribute includes one or more of a city associated with the entity, a country associated with the entity, and entity type.

In some embodiments, an attribute is a ship type associated with the entity.

Other objects and features will become apparent from the following detailed description considered in conjunction with the accompanying drawings. It is to be understood, however, that the drawings are intended as an illustration only and not as a definition of the limits of the present disclosure.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
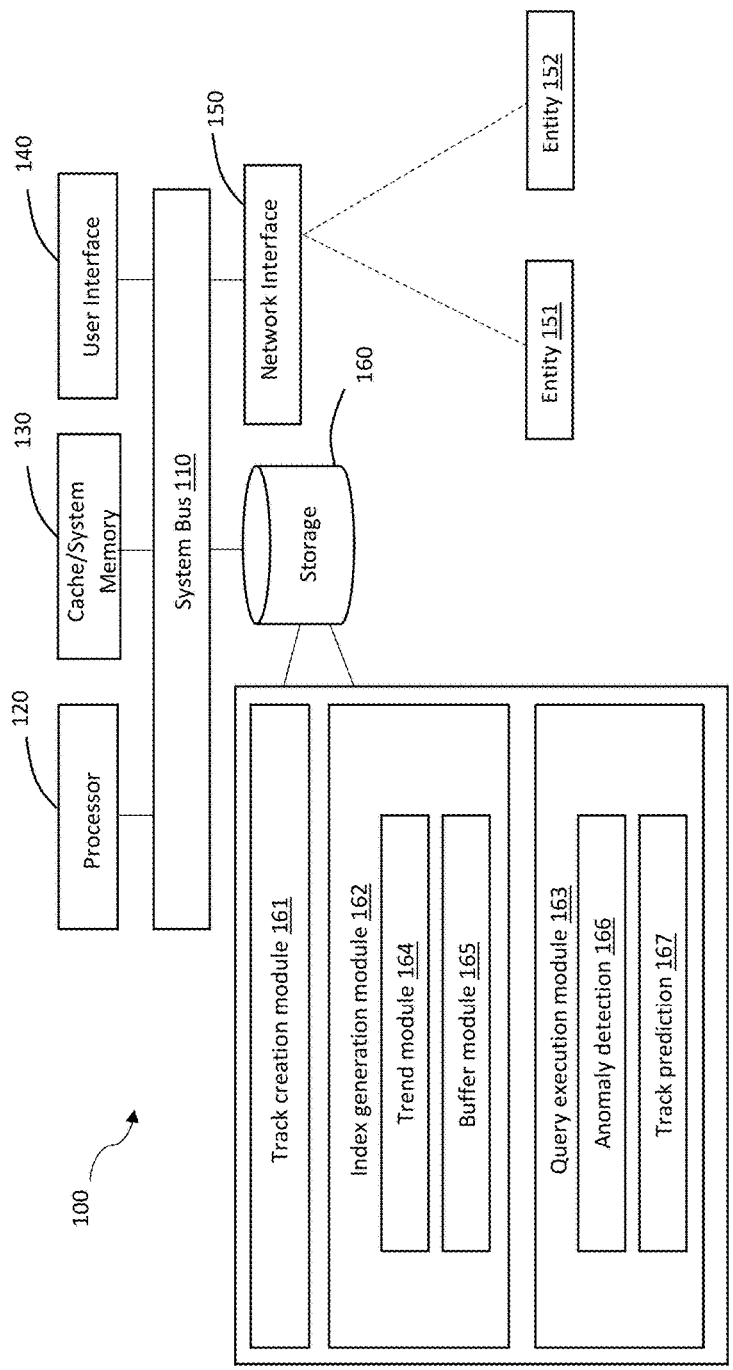
FIG. 1 illustrates a system for tracking at least one entity in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The ability to collect geospatial and temporal data has grown exponentially with the advent of new technologies. These new technologies can be implemented to collect geospatial and temporal data in a variety of applications. This data may be used to monitor the movement of, for example and without limitation, people during recreational activities, employees during work, automobiles, ships, aircraft, or the like.

The features of various embodiments described herein may leverage this data to accomplish a number of tasks. For example, suppose that Alice and Bob jog every day, and that both of them carry around sensors that periodically broadcast their identities and positions. After collecting a sufficient amount of data from these sensors, the features of various embodiments described herein may be able to predict the path that Bob is going to take by looking at the previous paths he has taken and building a predictive model therefrom.

As another example, suppose that Alice borrows Bob's sensor when she goes jogging. The systems and methods of various embodiments may be able to identify that the path taken is anomalous for Bob and that the sensor is likely to have been carried by Alice that day by looking at historical readings from both of their sensors. As yet another example, the systems and methods described herein may predict whether or not Alice and Bob will meet each other during their jogs for a given day by analyzing their trajectories.

FIG. 1 illustrates a system 100 for tracking at least one entity in accordance with one embodiment. The system 100 may include a processor 120, memory 130, a user interface 140, a network interface 150, and storage 160, all interconnected via one or more system buses 110. It will be understood that FIG. 1 constitutes, in some respects, an abstraction and that the actual organization of the system 100 and the components thereof may differ from what is illustrated.

The processor 120 may be any hardware device capable of executing instructions stored on memory 130 and/or in storage 160, or otherwise any hardware device capable of processing data. As such, the processor 120 may include a microprocessor, field programmable gate array (FPGA), application-specific integrated circuit (ASIC), or other similar devices.

The memory 130 may include various transient memories such as, for example L1, L2, or L3 cache or system memory. As such, the memory 130 may include static random access memory (SRAM), dynamic RAM (DRAM), flash memory, read only memory (ROM), or other similar memory devices and configurations.

The user interface 140 may include one or more devices for enabling communication with system operators and other personnel. For example, the user interface 140 may include a display, a mouse, and a keyboard for receiving user commands. In some embodiments, the user interface 140 may include a command line interface or graphical user interface that may be presented to a remote terminal via the network interface 150. The user interface 140 may execute on a user device such as a PC, laptop, tablet, mobile device, or the like, and may enable a user to input parameters regarding various entities and receive data regarding the tracking of one or more entities.

The network interface 150 may include one or more devices for enabling communication with other remote devices and entities to access one or more data sources comprising operational data for one or more retail stores in the fulfillment network. The network interface 150 may also allow for the transmission of suborders to one or more retail stores in the fulfillment network as discussed above. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The network interface 150 may receive geospatial and temporal data from one or more entities 151 and 152. For example, these entities may be configured with or otherwise have a transponder device that broadcasts information about the entity periodically. Using a combination of satellites and land-based radio receivers, it is possible to collect transmissions from these transponders from across the globe into a single dataset for analysis.

The entities 151 and 152 may be in communication with the system 100 over one or more networks that may link the various components with various types of network connections. The network(s) may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon which the processor 120 may operate.

For example, the storage 160 may include a track creation module 161, an index generation module 162, and a query execution module 163. The index generation module 162 may further include a trend module 164 and a buffer module 165, and the query execution module 163 may further include an anomaly detection module 166 and a track prediction module 167.

In operation, one or more entities 151 and 152 may broadcast data regarding their location and other identification information periodically to the network interface 150. As mentioned previously, these entities may include, but are not limited to, people, vehicles, aircraft, and maritime ships.

For example, the Automatic Identification System (AIS) Maritime Dataset may be analyzed to predict the paths of ships based on the prefix of their journey, determine when a ship is moving anomalously, and determine whether two vessels will meet each other in their journeys. These ships may broadcast or otherwise communicate data regarding their position every five minutes, for example.

Figures 2, 3:
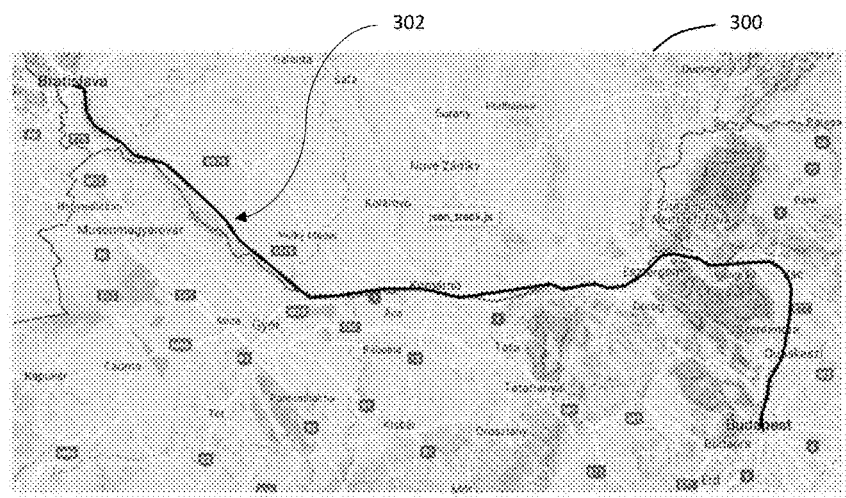
FIG. 2 depicts a table showing exemplary entity data in accordance with one embodiment.
FIG. 3 depicts a map showing an entity's track in accordance with one embodiment.

FIG. 2 depicts a table 200 showing exemplary data records in an AIS dataset, which is an automatic tracking system for maritime entities ("ships'). Each record in the dataset corresponds to a reading from a specific AIS transponder (i.e., a specific ship).

Rows of the dataset 200 contain the transponder's identification number (referred to as the Maritime Mobile Service Identity (MMSI)), the latitude/longitude position of the ship at the time of transmission, the timestamp for when the transmission was received, the speed and heading of the ship, information about the current status of the ship (e.g., turn, maneuver, Expected time of arrival (ETA), destination, etc.), as well as properties of the ship itself. These properties may include the dimensions of the ship, draught, and International Maritime Organization (IMO) number.

Entity data such as the data of table 200 may be communicated to the track creation module 161. The communicated data is essentially data regarding the location of a ship at a given time. However, the track creation module 161 may aggregate this data for each ship of interest to create a track for each ship.

In the context of the present application, the term "track" may refer to the path taken by an entity from a start location to an end location. For a ship, the track may refer to the ship's path taken from a first port to another port.

For example, FIG. 3 depicts a map 300 in accordance with one embodiment. The map 300 illustrates the track 302 of a ship between Bratislava and Budapest along the river Danube.

The track creation module 161 may aggregate the received data points to create a track representative of a particular ship's movement. For example, the track creation module 161 can join a plurality of data points to form a continuous segment that represents the ship's path, such as the path 302 of FIG. 3.

Preferably, the received data does not include a significant amount of noise such that tracking an entity with a desired amount of accuracy is unfeasible. For example, in some non-ideal scenarios, a first transmission may indicate that a ship is near New York City, but a second, erroneous transmission just five minutes later may indicate the same ship is off the coast of Africa. These inaccurate readings or transmissions may result from errors in data collection process.

The track creation module 161 may therefore include or otherwise execute any suitable device or algorithm to account for data points that are inaccurate or otherwise do not represent an entity's actual location. For example, in some embodiments, the track creation module 161 may include or otherwise execute a Kalman filter.

Also, entities often fail to transmit signals (or their signals are not received). For example, oftentimes an entity may "go dark" and be out of communication for several hours.

The track creation module 161 may therefore make certain assumptions about an entity's movement during these "dark" periods. For example, the track creation module 161 may generate a line segment connecting the data point representing the entity's last location before the entity went dark to the first data point received once the entity started broadcasting its location/its broadcasts were received.

Aggregating the records of an AIS dataset requires the track creation module 161 to first receive or otherwise collect all records associated with a given ship (e.g., through MMSI). Data regarding an entity's movement (i.e., tracks) may be represented in the GeoJSON format as set forth, for example, in Table 1 below:

TABLE 1

Exemplary GeoJSON Track Data

| Track | label 1 (country) | label 2 (ship type) |
| --- | --- | --- |

The above labels of Table 1 are merely exemplary and other labels in addition to or in lieu of those used in Table 1 may be used. Additionally, data representing ship tracks may be defined in the GeoJSON format and/or the Well-Known Text (WKT) format, which is one way to represent GeoJSON data.

The data of a track may be a GeoJSON string and include or otherwise be associated with a plurality of labels that describe the entity associated with the respective string. For example, label 1 may be "country" and label 2 may be "ship type."

In the context of the present application, the label "country" may refer to the country with which a particular ship is associated. In the context of the present application, the label "ship type" may refer to type of the corresponding ship (e.g., cargo, military, passenger, etc.).

Data regarding the tracks may be distributed across one or more databases. For example, each ship track may be replicated across multiple computing nodes thereby enabling better scalability.

The index generation module 162 may then compile the created tracks to generate an index. Once the index is generated, queries regarding the entities can be executed thereon. For example, a user may run a query on the index generation module 162 to ask "what are all the ship tracks that contain a particular geographical point?" The query execution module 163 may then search the generated indices and return one or more feature values.

Figure 4A:
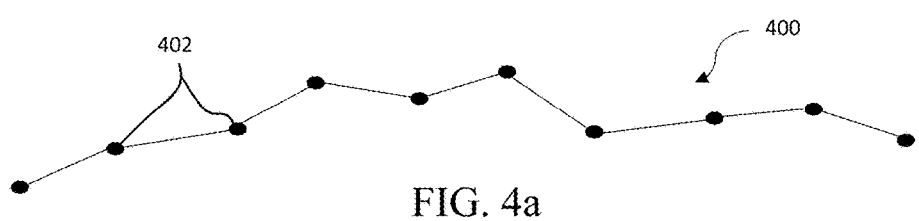
FIGS. 4a-b illustrate an exemplary track and an exemplary processed track in accordance with one embodiment.

To simplify one or more of the tracks, the trend module 164 of the index generation module 162 may perform any suitable averaging technique against a track. For example, FIG. 4a illustrates a ship track 400 comprising a plurality of points 402 representing the location of the ship at five minute intervals. To simplify the ship track 400, the trend module 164 may execute any suitable averaging function(s) to develop a trend line. For example, FIG. 4b illustrates a trend line 404 representing the averaged track 400 of FIG. 4a.

In accordance with a query such as the one mentioned above, it may be possible that ships have followed the same general path even though the corresponding geographical points may differ by some negligible amount (e.g., by one mile). Accordingly, the buffer module 165 may add a buffer to an entity track (or a trend line representing an entity track) to accommodate such variability.

Figure 4B:
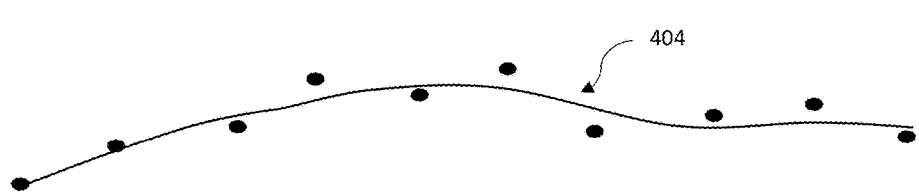
Figure 5:
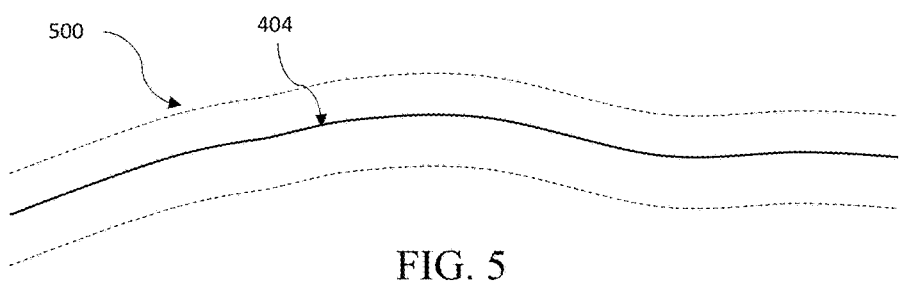
FIG. 5 illustrates the track of FIG. 4b with a buffer added thereto in accordance with one embodiment.

FIG. 5 illustrates the representative trend line 404 of FIG. 4b with a buffer 500 added thereto. The size of the buffer 500 (i.e., how much variability is allowed for a track to be "similar" to another) may be adjusted based on the preferences of a user and/or the task at hand. For example, a user may insert various operational parameters affecting the buffer using the user interface 140.

In the context of the present application, whether or not a given track is "similar" to another track(s) may refer to a number of characteristics. For example, a test (i.e., query) track may be considered similar to another track or tracks if the test track intersects the other track or tracks. This may be considered a "weak" similarity.

As another example, a test track may be considered similar to another track or tracks if the test track is a subset of the other track or tracks. This may be considered a "strong" similarity.

A track may also be similar to other tracks based on its buffer size. A test track may initially not be considered similar to another track. However, if the buffer size is increased a certain amount, tracks that were previously considered non-similar may eventually be considered similar. Accordingly, similarity may be defined based on the amount the buffer needs to be increased before tracks are considered similar.

Similarity may also be based on how many common features there are between ships. For example, if the query execution module discovers that a test track is similar to previous tracks, the query execution module can give more weight with those that have same label (2), ("ship type"). In other words, ships that have the same labels may be weighted more heavily than other ships without the same labels when assessing the similarity between ships.

Different aspects of similarity may be weighted differently. For example, if a test track is considered similar to another track because the test track is a subset of the other track, then this may be weighted heavily. If a test track is considered similar to another track because the test track simply intersects the other track, then this may be weighted, but not as heavily.

The query execution module 163 may receive queries regarding ship tracks and output feature values with respect to the received queries. For example, the query execution module 163 may include an anomaly detection module 166 and a track prediction module 167.

The anomaly detection module 166 may analyze the entity tracks to determine whether a given test track is anomalous with respect to one or more features. The anomaly detection module 166 may also output an anomaly score representing how anomalous a ship's track is with respect to a particular feature.

As mentioned previously, a ship's track i may have a country C assigned thereto. A user may want to know how anomalous this value C is for this track i. To determine this type of anomaly, a user may input the following predictive query:

(operation=track:country,$id=(i,)$):?

The resulting response from the query execution module 163 (namely, the anomaly detection module 166) may be a distribution over a set of country labels (country 1, probability 1), (country 2, probability 2) and so on. This result may show whether a particularly track is likely to have label country 1 with chance 100×probability 1, etc.

In other words the anomaly detection module 166 may determine how anomalous a given track is with respect to the Country associated with it. For example, a ship may declare itself to Antigua and Bermuda. The ship's track, however, may seem more like a track that is typically traversed by a German ship. In this case, the anomaly detection module 166 may therefore conclude that the track is anomalous with respect to its attribute Country.

Figure 6A:
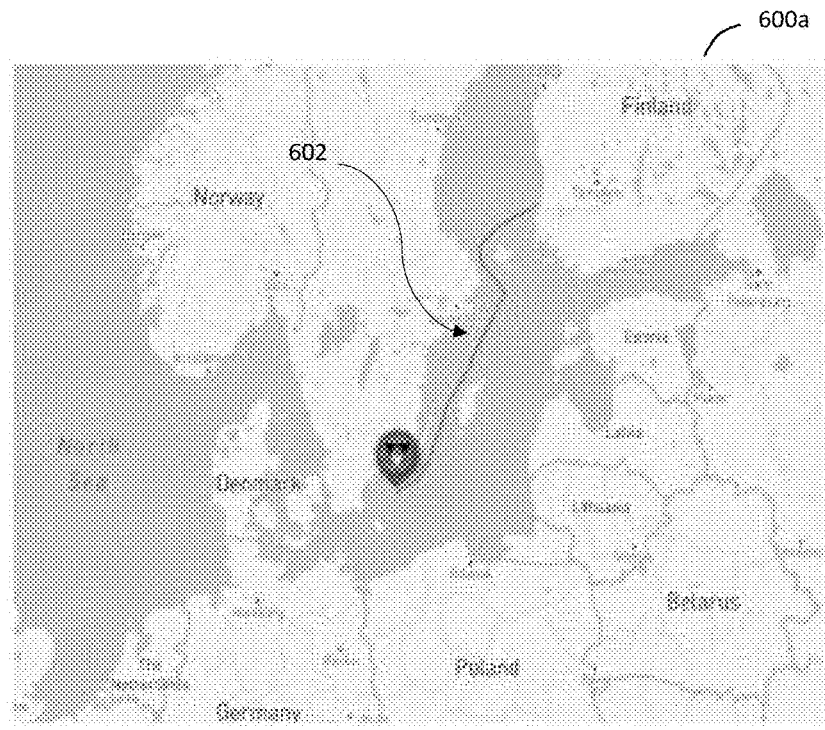
FIGS. 6a-b illustrate a prefix of a track and a track showing the prefix is anomalous, respectively, in accordance with one embodiment.

For example, FIG. 6a illustrates a map 600 showing an ongoing track 602. The ship associated with the track 602 has Antigua and Barbuda as its associated country.

Figure 6B:
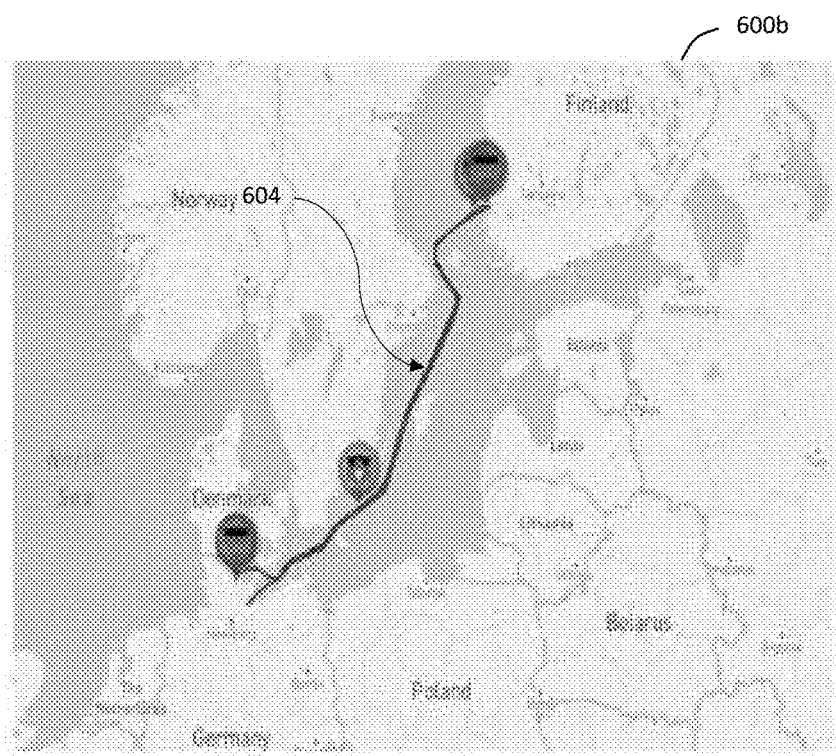

FIG. 6b shows a map 600b (of the same geographic area shown in map 600a) and historical tracks 604 of ships associated with Germany. Accordingly, the anomaly detection module 166 may determine that track 602 is likely associated with a German ship, and that the track 602 is anomalous with respect to its attribute Country.

Figure 7:
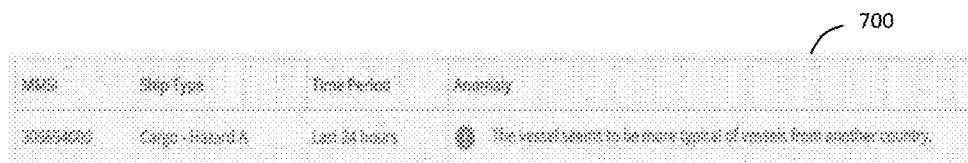
FIG. 7 illustrates a notification that the track of FIG. 6a is anomalous in accordance with one embodiment.

FIG. 7 illustrates a notification window 700 that may be presented to a user regarding the detected anomaly with respect to FIGS. 6a-b. Specifically, the notification window 700 may notify a user of a detected anomaly and provide a message such as "the vessel seems to be more typical of vessel from another country."

The anomaly detection module 166 may also consider relationships between certain countries to better detect anomalies. For example, ships associated with Korea may have similar tracks to tracks of ships associated with China (and vice versa). In other words, because of Korea's and China's close geographic proximity to each other, ships associated with Korea and ships associated with China may have similar tracks.

Figure 8:
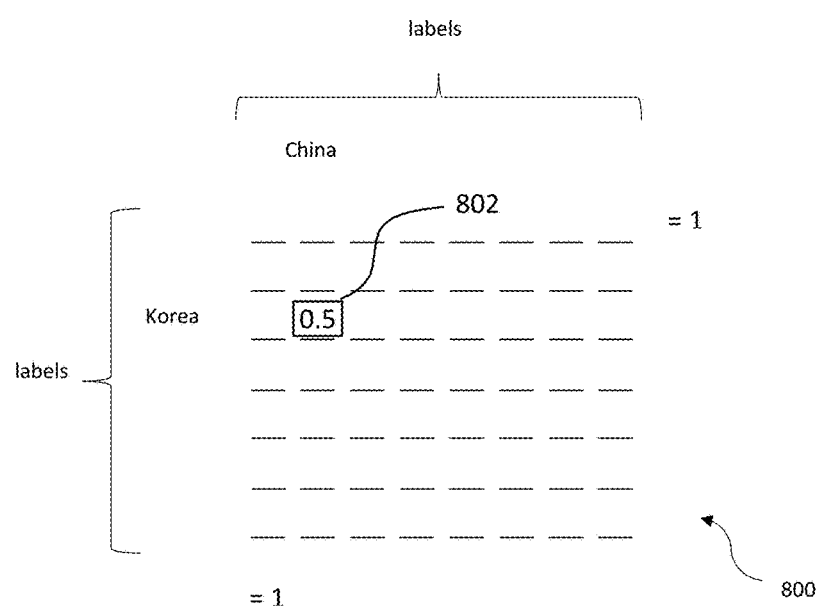
FIG. 8 illustrates an exemplary confusion matrix in accordance with one embodiment.

The anomaly detection module 166 may therefore calculate a confusion matrix to account for these similarities. For example, FIG. 8 depicts an exemplary confusion matrix 800 in accordance with one embodiment. The axes may be marked by label of interest (e.g., countries), and each element of the matrix 800 may represent the probability that the particular label on the vertical axis may be confused with the corresponding label on the horizontal axis.

For example, entry 802 may correspond to the probability that a track associated with Korea may be confused with a track associated with China. This entry may be equal to or approximately 0.5 because tracks associated with Korea may be confused with tracks associated with China due to their geographic proximity.

These computations prevent the anomaly detection module 166 from making erroneous claims regarding "anomalous" tracks when, for example, a new track from Korea is similar to tracks associated with China. In other words, the confusion matrix 800 may help prevent or otherwise limit false positives.

Referring back to FIG. 1, the track prediction module 167 may return feature values with respect to an entity's future movement. For example, based on a partially completed track, a user may want to receive a prediction about the entity's expected track.

The track prediction module 167 may therefore return a prediction of an on-going track using the currently observed prefix of the track. To that end, to predict the completion of a given track i, which has its prefix t(i) known, a user may make the following query:

(operation=track:geo_complete,$id=(i)$):?

The resulting response may be a distribution over a set of tracks: (t1, probability 1), (t2, probability 2) and so on. The predicted track with the highest chance is the most likely outcome for the track.

Figure 9:
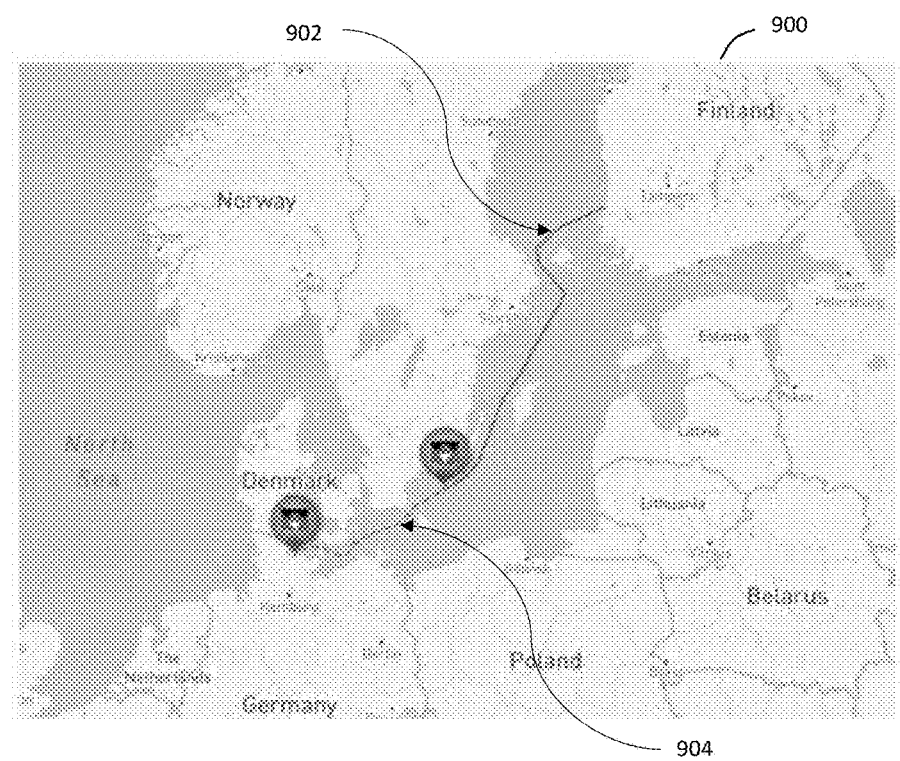
FIG. 9 illustrates a prefix of a track and a track prediction in accordance with one embodiment.

FIG. 9 shows a map 900 that includes prefix of a track 902 (i.e., the completed portion of a ship's track). To receive a prediction of the rest of the ship's track, a user may input a query such as the query mentioned above.

To execute this query, the track prediction module 167 may first cluster the tracks into one or more clusters based on certain characteristics. For example, the track prediction module 167 may sort the ship tracks into clusters such that tracks that are similar with respect to some feature (e.g., country, ship type, similar partial tracks, etc.) are in the same cluster.

The track prediction module 167 may analyze the created clusters to find tracks similar to the track 902 of FIG. 9. The track prediction module 167 may consider the weighting and the common features between the ship associated with the track 902 and the clustered tracks.

Based on the similarities (as well as the weights assigned thereto) between the ship associated with track 902 and the clustered tracks, the track prediction module 167 may then supply the most likely outcome of the ship's track 902.

For example, as seen in FIG. 9, the track prediction module 167 may supply a track prediction 904 that may inform a user of the most likely outcome for the track 902. This prediction may be based on the country associated with the ship, the ship type, or the like.

Figure 10:
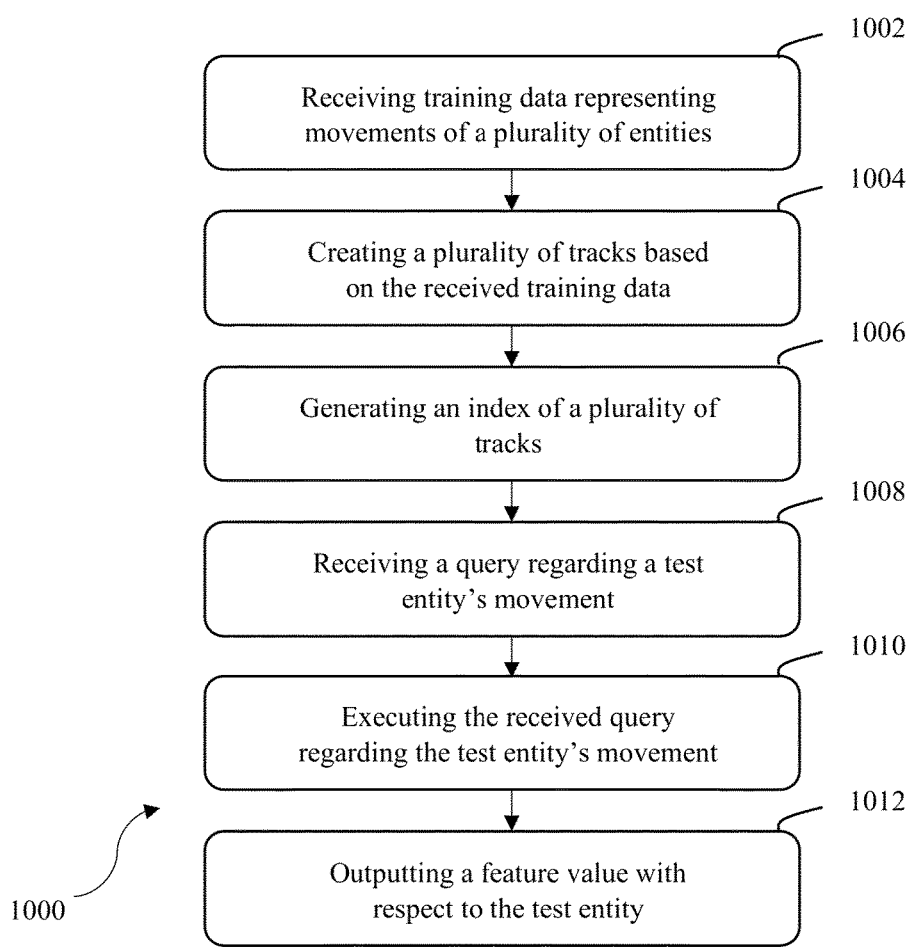
FIG. 10 depicts a flowchart of a method for tracking at least one entity in accordance with one embodiment.

FIG. 10 depicts a flowchart of a method 1000 for tracking an entity in accordance with one embodiment. Step 1002 involves receiving training data representing movements of a plurality of training entities using an interface. Although several of the examples herein concern ships, other entities may be tracked in accordance with various implementations of the systems and methods described herein. These entities may include, people (family members, friends, employees), recreational vehicles, commercial vehicles, passenger aircraft, commercial aircraft, military aircraft, military ships, transportation ships, cruise ships, personal maritime vessels, or the like. This list is merely exemplary and other types of entities may be tracked in accordance with various embodiments.

Step 1004 involves creating, using at least one processor executing instructions stored on a memory, a plurality of tracks based on the received training data, wherein each track represents the movement of a training entity and is associated with at least one attribute. The processor may be similar to the processor 120 of FIG. 1 and execute modules similar to the modules of FIG. 1.

The created tracks may essentially be a compilation of various locations of entities at certain points in time (e.g., at five-minute intervals). The created tracks may be similar to the track 400 of FIG. 4*a*, for example.

Step 1006 involves generating, using the at least one processor, an index of the plurality of tracks. This step may be performed by the index generation module 162 of FIG. 1, for example. The generated index can therefore respond to queries regarding entity tracks.

Step 1008 involves receiving a query regarding a test entity's movement using the interface. The test entity may refer to a particular entity for which a certain feature value or values are desired. The query may be related to the entity's predicted movement and/or whether or not the entity's movement is anomalous with respect to one or more features.

Step 1010 involves executing, using the at least one processor, the received query regarding the test entity's movement against the generated index. The processor may then analyze the generated index to respond to the received query.

Step 1012 involves outputting, using the at least one processor, a feature value with respect to the test entity based on the generated index. The feature value may be presented to a user via a user interface such as the user interface 140 of FIG. 1. The feature value may depend on the received query, and may relate to the predicted movement of an entity, whether two or more tracks are likely to intersect with each other, and whether an entity's movement is anomalous with respect to some feature.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A system for tracking at least one entity, the system comprising:
    an interface for at least receiving:
        training data representing movements of a plurality of training entities, and
        a query regarding a test entity's movement;
    a memory; and
    at least one processor executing instructions stored on the memory to:

create a plurality of tracks based on the received training data, wherein each track represents the movement of a training entity and is associated with at least one attribute, generate an index of the plurality of tracks by defining at least one of the tracks using a plurality of points from the received training data, wherein each point of the plurality represents a location of a training entity at a point in time, execute a function to develop a trend line associated with the plurality of points, represent the track by the developed trend line and add a buffer to the developed trend line, execute the received query regarding the test entity's movement on the generated index, and output a feature value with respect to the test entity based on the generated index.

2. The system of claim 1 wherein the test entity is selected from the group consisting of a person, a ship, an aircraft, and a vehicle.

3. The system of claim 1 wherein the feature value is an anomaly score representing whether the test entity's movement is anomalous with respect to the at least one attribute.

4. The system of claim 1 wherein the feature value is a prediction of the test entity's movement.

5. The system of claim 1 wherein the at least one attribute includes one or more of a city associated with the entity, a country associated with the entity, and an entity type.

6. A method for tracking at least one entity, the method comprising:

receiving training data representing movements of a plurality of training entities using an interface;

creating, using at least one processor executing instructions stored on a memory, a plurality of tracks based on the received training data, wherein each track represents the movement of a training entity and is associated with at least one attribute;

generating, using the at least one processor, an index of the plurality of tracks by defining at least one of the tracks using a plurality of points from the received training data, wherein each point of the plurality represents a location of a training entity at a point in time;

executing a function to develop a trend line associated with the plurality of points;

representing the track by the developed trend line and adding a buffer to the developed trend line;

receiving a query regarding a test entity's movement using the interface;

executing, using the at least one processor, the received query regarding the test entity's movement on the generated index; and outputting, using the at least one processor, a feature value with respect to the test entity based on the generated index.

7. The method of claim 6 wherein the test entity is selected from the group consisting of a person, a ship, an aircraft, and a vehicle.

8. The method of claim 6 wherein the feature value is an anomaly score representing whether the test entity's movement is anomalous with respect to the at least one attribute.

9. The method of claim 6 wherein the feature value is a prediction of the test entity's movement.

10. The method of claim 6 wherein the at least one attribute includes one or more of a city associated with the entity, a country associated with the entity, and an entity type.

11. A system for tracking at least one entity, the system comprising:

an interface for at least receiving:
training data representing movements of a plurality of training entities, and
a query regarding a test entity's movement;

a memory; and at least one processor executing instructions stored on the memory to:
create a plurality of tracks based on the received training data, wherein each track represents the movement of a training entity and is associated with at least one attribute, generate an index of the plurality of tracks by defining at least one of the tracks using a plurality of points from the received training data, wherein each point of the plurality represents a location of a training entity at a point in time execute a function to develop a trend line associated with the plurality of points, represent the track by the developed trend line and adding a buffer to the developed trend line, execute the received query regarding the test entity's movement on the generated index, and output at least one of:
an anomaly score representing whether the test entity's movement is anomalous with respect to the at least one attribute, and
a prediction of the test entity's movement.

12. The system of claim 11 wherein the test entity is selected from the group consisting of a person, a ship, an aircraft, and a vehicle.

13. The system of claim 11 wherein the at least one attribute includes one or more of a city associated with the entity, a country associated with the entity, and entity type.

14. The system of claim 11 wherein an attribute is a ship type associated with the entity.

* * * * *